(12) United States Patent
Garg

(10) Patent No.: US 10,776,973 B2
(45) Date of Patent: *Sep. 15, 2020

(54) VANISHING POINT COMPUTATION FOR SINGLE VANISHING POINT IMAGES

(71) Applicant: Adobe Inc., San Jose, CA (US)

(72) Inventor: Saurabh Garg, New Delhi (IN)

(73) Assignee: ADOBE INC., San Jose, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/972,779

(22) Filed: May 7, 2018

(65) Prior Publication Data

US 2019/0340798 A1 Nov. 7, 2019

(51) Int. Cl.
| | | |
|---|---|---|
| *G06T 11/60* | (2006.01) | |
| *G06T 7/536* | (2017.01) | |
| *G06T 3/00* | (2006.01) | |
| *G06T 3/40* | (2006.01) | |
| *G06T 7/12* | (2017.01) | |
| *G06T 7/143* | (2017.01) | |
| *G06T 7/13* | (2017.01) | |
| *G06K 9/62* | (2006.01) | |

(52) U.S. Cl.
CPC ............ *G06T 11/60* (2013.01); *G06T 3/0093* (2013.01); *G06T 3/40* (2013.01); *G06T 7/12* (2017.01); *G06T 7/13* (2017.01); *G06T 7/143* (2017.01); *G06T 7/536* (2017.01); *G06K 9/6223* (2013.01); *G06T 2207/20152* (2013.01); *G06T 2207/20221* (2013.01)

(58) Field of Classification Search
CPC . G06T 11/60; G06T 7/143; G06T 7/13; G06T 7/536; G06T 7/12; G06T 3/40; G06T 3/0093; G06T 2207/20152; G06T 2207/20221; G06K 9/6223; G06T 19/006
See application file for complete search history.

(56) References Cited

U.S. PATENT DOCUMENTS

| | | | |
|---|---|---|---|
| 6,778,699 B1 | 8/2004 | Gallagher | |
| 8,396,285 B2 * | 3/2013 | Maurer | G06K 9/52 382/154 |
| 2006/0244749 A1 * | 11/2006 | Kondo | G06T 15/20 345/427 |

(Continued)

*Primary Examiner* — Chante E Harrison
(74) *Attorney, Agent, or Firm* — Kilpatrick Townsend & Stockton LLP

(57) ABSTRACT

Certain embodiments involve calculating a vanishing point location of an image to realistically blend multiple images. For example, a method for modifying image content based on a vanishing point location computed for a background image includes receiving the background image and classifying a set of planes in the background image. The method also includes identifying, using plane boundaries, a first set of line segments that define first convergence points. Additionally, the method includes identifying a second set of line segments that are positioned within individual planes and that define second convergence points. Further, the method includes grouping the first convergence points and the second convergence points into a cluster and computing the vanishing point location from an average of point locations in the cluster. Furthermore, the method includes manipulating a feature image overlaid on the background image to generate a blended image based on the vanishing point location.

19 Claims, 9 Drawing Sheets

(56) References Cited

U.S. PATENT DOCUMENTS

| | | | | |
|---|---|---|---|---|
| 2015/0160539 A1* | 6/2015 | Bassi | ............... | G06T 7/80 |
| | | | | 353/69 |
| 2015/0332117 A1* | 11/2015 | Zhou | ............... | G06T 5/008 |
| | | | | 382/201 |
| 2017/0084081 A1* | 3/2017 | Ishihara | ............... | G06T 19/006 |
| 2017/0352192 A1* | 12/2017 | Petrovskaya | ......... | G06T 19/006 |
| 2018/0196336 A1* | 7/2018 | Bassi | ............... | G06T 7/80 |

* cited by examiner

VANISHING POINT COMPUTATION FOR SINGLE VANISHING POINT IMAGES

TECHNICAL FIELD

This disclosure relates generally to methods that compute vanishing point locations in images. More specifically, but not by way of limitation, this disclosure relates to computing a vanishing point location in a background image by single vanishing points by excluding, from a vanishing point calculation, extraneous line segments in the image that do not converge to the single vanishing point.

BACKGROUND

Image rendering systems, such as augmented reality systems, may render two-dimensional images and provide image overlays on the rendered two-dimensional images. In one example, the image overlay may be a picture frame positioned on a wall depicted in the rendered two-dimensional image. To blend the image overlays with the rendered two-dimensional images, perspective is applied to the image overlays to match the perspective of the two-dimensional images. To provide augmented reality images to a user in real-time or near real-time, image overlays should be applied to the background images with appropriate perspective as quickly as possible.

Applying perspective to an overlay image requires locating vanishing points on background images to more accurately depict an object from the overlay image in the environment of the background image. For instance, in the example above, parallel lines of the picture frame are warped such that the parallel lines are directed to the vanishing point of the rendered two-dimensional image to accurately depict the picture frame with the same perspective as the rendered two-dimensional image. Existing techniques determine a vanishing point location based on every line segment of a background image. Once all of the line segments are identified, each intersection generated by extending each of the line segments is computed, and the intersections are provided to a clusterer that approximates a vanishing point.

Such techniques carry a significant computation cost due to the identification and reliance of each of the line segments in the image. The computation cost may, for example, result in a significant time lag when attempting to overlay images with appropriate perspective on the background image. Further, because some line segments in a background image are not relevant to a vanishing point calculation, inaccuracies are introduced into a mechanism of calculating the vanishing point (e.g., the clusterer) that may disrupt the calculation of the vanishing point.

SUMMARY

Certain embodiments involve computing a vanishing point for a single vanishing point image. For example, a method for modifying image content based on a vanishing point location computed for a background image includes a processing device performing operations. The operations include receiving the background image and classifying a set of planes present in the background image. Additionally, the operations include identifying, using plane boundaries of the set of planes, a first set of line segments that define first convergence points and identifying a second set of line segments that are positioned within individual planes of the set of planes and that define second convergence points. The operations also include grouping the first convergence points and the second convergence points into a cluster and computing the vanishing point location from an average of point locations in the cluster. Further, the operations include manipulating a feature image overlaid on the background image to generate a blended image based on the vanishing point location.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
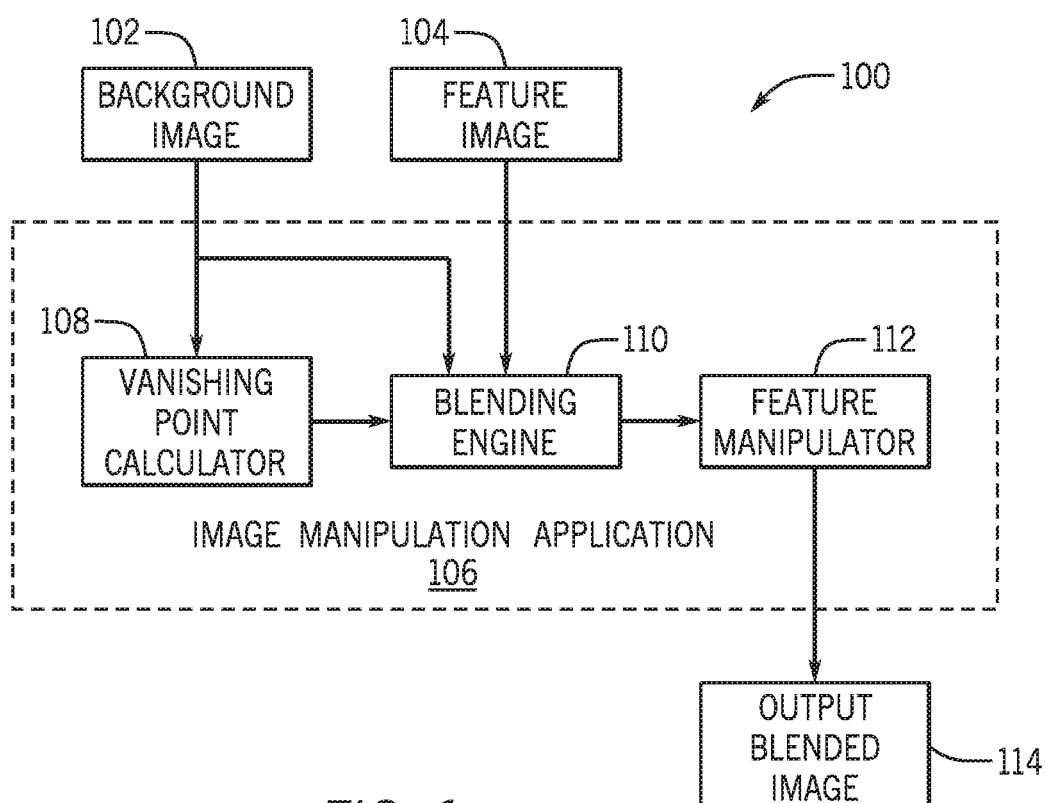
FIG. 1 depicts an example of a computing environment for calculating a vanishing point to control image blending operations of a background image and a feature image, according to certain embodiments of the present disclosure.

Certain embodiments involve computing a vanishing point location in a background image by single vanishing points by excluding, from a vanishing point calculation, extraneous line segments in the image that do not converge to the single vanishing point. As explained above, conventional solutions for locating vanishing points expend significant amounts of processing power by, for example, using every straight line segment in a background image to compute a vanishing point, even if the line segment does not converge to the vanishing point. Because images may contain an abundance of straight lines, and a significant percentage of the straight lines may not be valuable when determining the vanishing point, the resulting vanishing point computations may not be accurate even when these significant processing resources are expended. Certain embodiments described herein address this issue by, for example, paring down a number of line segments of a background image used to locate the vanishing point. For instance, a vanishing point calculator described herein focuses on line segments that converge toward a vanishing point and ignores other, extraneous line segments. By relying on a limited number of line segments, the vanishing point calculator is able to calculate the location of the vanishing point using a reduced amount of processing bandwidth as compared to certain conventional solutions described above. And eliminating extraneous line segments improves the accuracy of the vanishing-point computation by eliminating reliance on line segments that are likely irrelevant, and potentially disruptive, to the computation.

The following non-limiting example is provided to introduce certain embodiments. In this example, an image manipulation system having one or more processing devices executes an image manipulation module to manipulate images received by the image manipulation system. The image manipulation system receives a background image representing a location receptive to overlaid feature images. An example of the background image is a sparsely decorated interior room with a single vanishing point. The image manipulation module classifies a set of planes present in the background image. In an example, the planes are representative of a floor, a ceiling, and any number of walls depicted within the background image. A number of boundaries between the planes form line segments with slopes directed to the single vanishing point location of the background image. Accordingly, the image manipulation module identifies a first set of line segments using the plane boundaries of the set of planes (e.g., by applying a watershed algorithm on the background image). Plane boundaries that are perpendicular or parallel with a horizontal axis of the background image are excluded from the first set of line segments, as such plane boundaries are irrelevant to a determination of the single vanishing point location.

Continuing with this example, the image manipulation module identifies a second set of line segments positioned within individual planes of the set of planes that also include slopes directed to the single vanishing point location of the background image. The second set of line segments excludes line segments with slopes greater than +1 and less than −1, as such line segments are unlikely to be relevant to the determination of the single vanishing point location. In the example, the second set of line segments include wall molding, trim work, door jambs and headers, and any other objects that form lines within the plane boundaries of the background image. The image manipulation module also groups first convergence points of the first set of line segments and second convergence points of the second set of line segments into a cluster. To determine the vanishing point location, the image manipulation module computes the vanishing point location from an average of point locations in the cluster. Based on the average of the point locations in the cluster, the image manipulation module returns the vanishing point location. Using the vanishing point location, the image manipulation module manipulates a feature image overlaid on the background image. The image manipulation module manipulates the feature image by applying a scaling operation or a perspective warping operation on the feature image in such a manner that the feature image includes the same perspective as the background image.

As used herein, the term "blending" is used to refer to any image-processing operation that combines a feature image with a background image. In some embodiments, blending involves scaling and/or perspective warping a feature image to correspond with a vanishing point location of a background image.

As used herein, the term "image" is used to refer to graphical content from a photograph, a drawing, or some combination thereof. Any set of graphical content items (i.e., a feature image or other graphic and a background image or other graphic) can be automatically blended in accordance with one or more embodiments described herein.

As used herein, the term "vanishing point" is used to refer to a point on an image plane where two-dimensional projections of a set of parallel lines in three-dimensional space appear to converge. Applying matching perspective to an image (e.g., a feature image) overlaid on top of another image (e.g., a background image) involves matching vanishing points of the two images.

As used herein, the term "image manipulation application" is used to refer to one or more applications, online services, or combinations thereof that include tools for blending a background image and a feature image. Blending the two images includes matching perspectives and scales between the two images based on a location of a vanishing point of the background image.

Certain embodiments described herein facilitate using automated image manipulation systems for determining vanishing point locations and manipulating images based on the vanishing point locations. Examples of the automated image manipulation systems include one or more processors capable of executing instructions associated with determining the vanishing point locations and manipulating images. The use of the vanishing point locations allows images overlaid on background images to have the same perspective as the background image.

Example of an Operating Environment for Automatically Calculating a Location of a Vanishing Point to Control Image Blending Operations Referring now to the drawings, FIG. 1 depicts an example of a computing environment 100 for calculating a vanishing point to control image blending operations of a background image 102 and a feature image 104. The computing environment includes an image manipulation application 106, which is executed by one or more computing devices. The image manipulation application 106 includes a vanishing point calculator 108, a blending engine 110, and a feature manipulator 112.

The vanishing point calculator 108 receives the background image 102 to automatically generate a location of a vanishing point within the background image 102. In one example, the background image 102 is an interior image and includes a single vanishing point.

The image manipulation application 106 also receives the feature image 104 at the blending engine 110, and the vanishing point calculator 108 provides the background image 102 and the location of the vanishing point to the blending engine 110. In another embodiment, the image manipulation application 106 receives the background image 102 at the blending engine 110, while the vanishing point calculator 108 provides the location of the vanishing point to the blending engine 110. The blending engine 110 positions the feature image 104 over the background image 102. The feature image refers to an image of a feature (e.g., a picture frame, a piece of furniture, a ceiling fan, etc.) capable of providing additional complexity to the background image 102.

In one example, the image manipulation application 106 applies the feature manipulator 112 to the feature image 104. The feature manipulator 112 enhances effectiveness of the blending engine 110 by applying scaling and perspective warping effects to the feature image 104 on the background image 102. Scaling and perspective warping effects applied to the feature image 104 provide an optical appearance that the feature image 104 is within the background image 102 rather than merely on top of the background image 102. The scaling and perspective warping effects are generated for the feature image 104 based on the location of the vanishing point of the background image 102. For example, the location of the vanishing point influences orientation of parallel lines of the feature image 104, and proximity of the feature image 104 to the vanishing point influences the scale of the feature image 104. That is, as the feature image 104 moves closer to the vanishing point of the background image 102, the size of the feature image 104 is reduced by the feature manipulator 112.

The feature manipulator 112 generates an output blended image 114 by applying the scaling and perspective warping effects to the feature image 104 based on a location of the feature image 104 on the background image 102. For instance, the feature manipulator 112 changes how the effects are applied to the feature image 104 based on the positioning of the feature image 104 on the background image 102. The output blended image 114 can be used for a wide range of applications, such as automatic blending generation and dynamic content blending (videos).

In one or more examples, the image manipulation application 106 is implemented in an online environment to generate the output blended image 114. For example, the online environment is an online catalog selling items that are represented by the feature images 104. If a consumer wants to see how the item would look inside a room, the online environment can provide the consumer with a stock background image 102 or the consumer can upload a photograph of a room within a house of the consumer, for example. In either embodiment, the consumer is able to move the feature image 104 of the item being sold in the online catalog around the room to see, via the output blended image 114, how the item will look within the room prior to purchasing the item.

Examples of Calculating a Vanishing Point for Image Blending

Figure 2:
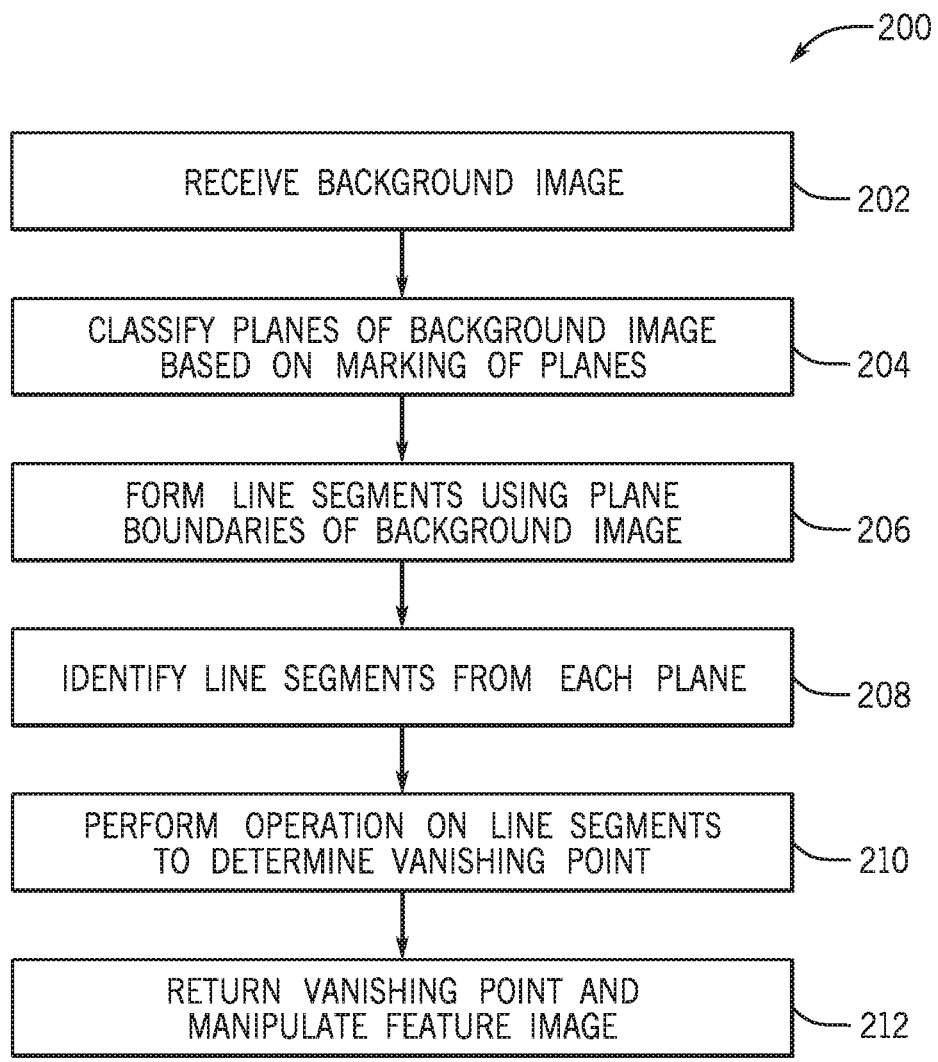
FIG. 2 depicts an example of a process for performing a vanishing point calculation operation on a background image, according to certain embodiments of the present disclosure.

FIG. 2 depicts an example of a process 200 for performing a vanishing point operation for the background image 102 with a single vanishing point. One or more processing devices implement operations depicted in FIG. 2 by executing suitable program code (e.g., the image manipulation application 106). For illustrative purposes, the process 200 is described with reference to certain examples depicted in the figures. Other implementations, however, are possible.

At block 202, the process 200 involves receiving a background image. One or more processing devices execute the image manipulation application 106 (or suitable other program code) to implement block 202. For instance, executing the image manipulation application 106 causes one or more processing devices to receive or otherwise access the background image 102 that is stored in a non-transitory computer-readable medium. In some embodiments, receiving or accessing the background image 102 involves communicating, via a data bus, suitable signals between a local non-transitory computer-readable medium and the processing device. In additional or alternative embodiments, receiving or accessing the background image 102 involves communicating, via a data network, suitable signals between a computing system that includes the non-transitory computer-readable medium and a computing system that includes the processing device.

At block 204, the process 200 involves classifying planes within the background image 102. The planes of the background image 102 include any flat surfaces depicted in the image, such as a ceiling, a floor, walls, doors, etc. One or more processing devices execute the image manipulation application 106 to implement block 204. For instance, executing the image manipulation application 106 causes the vanishing point calculator 108 to receive or otherwise access identification of the planes within the background image 102. In an embodiment, a user of a mobile device or a computer device manually identifies a location of a plane depicted in the background image 102 and assigns the plane with a description (e.g., ceiling, floor, left wall, right wall, back wall, etc.). In another embodiment, the processing device automatically locates planes within the background image 102 and assigns the planes with a description based on locations of the planes within the image.

Once the planes have been located, a watershed segmentation operation is applied to the background image 102 by the processing device to identify boundaries of the identified planes within the background image 102. In one example, the watershed segmentation operation transforms the background image 102 to grayscale and treats gradient magnitudes of pixels as a topographic surface. The pixels within the background image 102 with a highest gradient magnitude intensity corresponds to a watershed line. A location or path of the watershed line represents a boundary between the planes identified in the background image 102. Other techniques are also usable to find plane boundaries within the background image 102.

Defining the planes of the background image 102 with the description may correspond to how the feature image 104 is viewed when overlaid on the background image 102. In an example, when the feature image 104 is a picture frame, the image manipulation application 106 includes instructions that restrict the feature image 104 from being overlaid on a ceiling or a floor of the background image 102. Other image rules relating to placement of the feature image 104 on the background image 102 are also available as part of the image manipulation application 106.

At block 206, the process 200 involves forming line segments using plane boundaries of a background image. For instance, executing the image manipulation application 106 causes the vanishing point calculator 108 to form line segments of the background image 102 from the plane boundaries determined using the watershed segmentation operation or other technique of block 204. The plane boundaries provide a set of line segments with slopes that converge on the vanishing point of the background image 102.

At block 208, the process 200 involves identifying line segments from within planes of a background image. For instance, executing the image manipulation application 106 causes the vanishing point calculator 108 to identify line segments of the background image 102 that are within each of the identified plane boundaries determined using the watershed segmentation operation or other technique of block 204. In one or more embodiments, the line segments within the plane boundaries include wall molding, trim work, door jambs and headers, or any other objects that form lines within the plane boundaries. In an embodiment, the line segments from within the plane boundaries of the background image 102 provide additional samples for the vanishing point calculator 108 to determine the vanishing point of the background image 102.

At block 210, the process 200 involves performing an operation on identified line segments to determine the vanishing point. For instance, executing the image manipulation application 106 causes the vanishing point calculator 108 to locate a cluster of convergence points between each of the line segments of the background image 102 identified at blocks 206 and 208, and to determine a location representative of a center point (e.g., an average location) of the cluster of the convergence points. The center point of the cluster of convergence points is used as the vanishing point of the background image 102. In one example, the operation on the identified line segments is a k-means clustering operation, which is discussed in greater detail below with respect to FIG. 4.

At block 212, the process 200 involves returning a vanishing point of a background image and manipulating a feature image based on the vanishing point. For instance, executing the image manipulation application 106 causes the vanishing point calculator 108 to return the vanishing point of the background image 102 based on a location of the center point of the cluster of convergence points calculated at block 210. As discussed in further detail below with respect to FIG. 7, the vanishing point of the background image 102 is used in an example to manipulate the feature image 104 to blend the feature image 104 with the background image 102.

Figure 3:
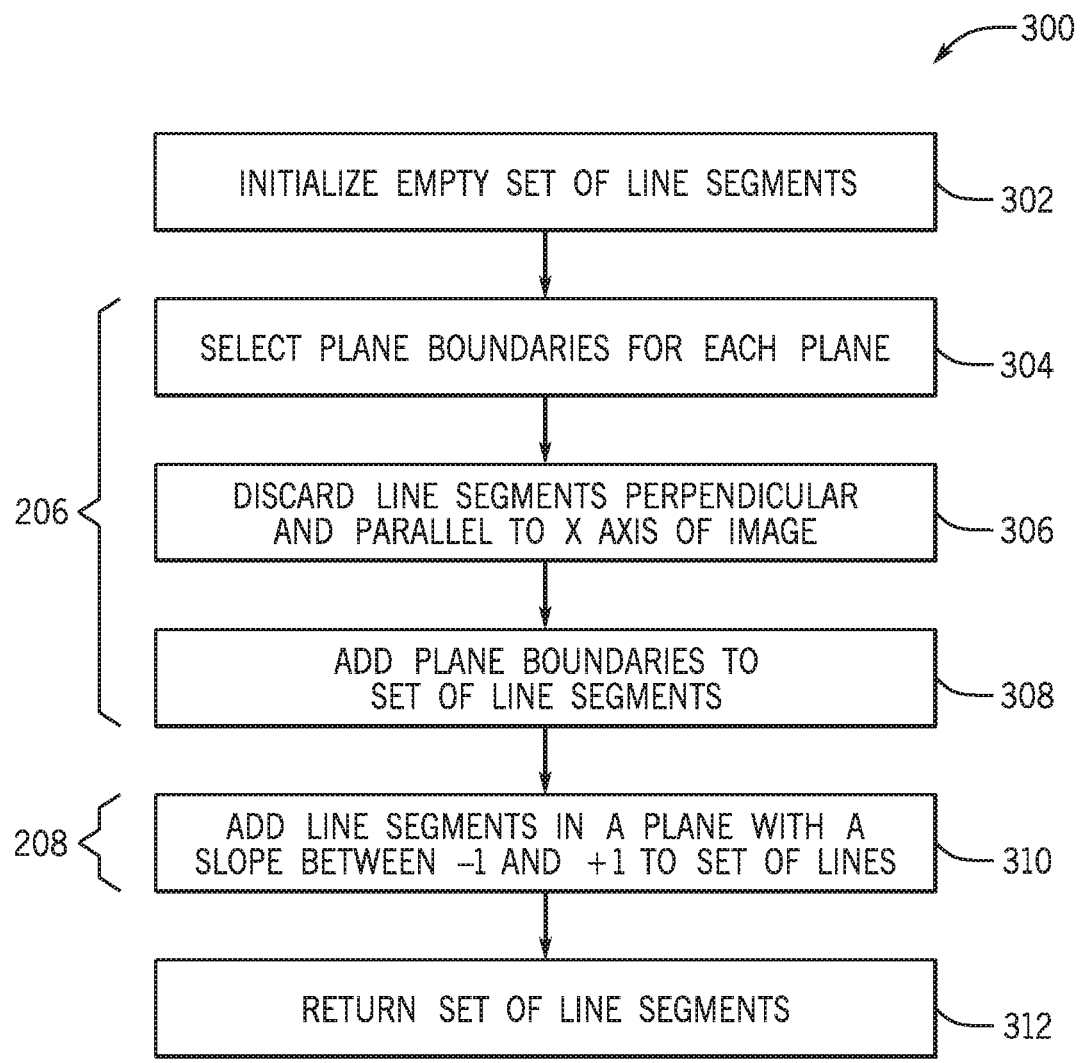
FIG. 3 depicts an example of a process for selecting a set of line segments of a background image for use in a vanishing point calculation, according to certain embodiments of the present disclosure.

FIG. 3 depicts an example of a process 200 for selecting a set of line segments of the background image 102 for use in a vanishing point calculation. One or more processing devices implement operations depicted in FIG. 3 by executing suitable program code (e.g., the image manipulation application 106). For illustrative purposes, the process 300 is described with reference to certain examples depicted in the figures. Other implementations, however, are possible.

At block 302, the process 300 involves initializing an empty set of line segments. One or more processing devices execute the image manipulation application 106 (or suitable other program code) to implement block 302. For instance, executing the image manipulation application 106 causes one or more processing devices to reserve storage space in a non-transitory computer-readable medium for the set of line segments that will be identified by the vanishing point calculator 108. In an example, the processing devices may limit a number of line segments that are available for use by the vanishing point calculator 108 to improve processing efficiency. For example, with a limited number of line segments, a smaller number of convergence points are calculated and the k-means operation considers the smaller number of convergence points when calculating the vanishing point of the background image 102.

At block 304, the process 300 involves selecting plane boundaries for each plane for inclusion in the initialized set of line segments. As discussed above with respect to FIG. 2, the plane boundaries may be determined using a watershed segmentation operation or other technique capable of finding intersections between planes of an image. Particularly as it relates to a background image with minimal features (e.g., an interior of a cube), convergence locations of well-defined plane boundaries enable the vanishing point calculator 108 to accurately locate the vanishing point of the background image 102. For example, the vanishing point calculator 108 is able to provide an accurate prediction of the location of the vanishing point relying on only the plane boundaries of the background image 102 as the set of line segments.

At block 306, the process 300 involves discarding line segments perpendicular and parallel to a horizontal axis of an image. For instance, executing the image manipulation application 106 causes the vanishing point calculator 108 to discard line segments identified at block 304 that are perpendicular or parallel to a horizontal axis of the background image 102. The line segments that are perpendicular or parallel to the horizontal axis of the background image 102 do not converge with other line segments at the vanishing point. Therefore, such line segments are not relevant to determining the vanishing point location of the background image 102, and the line segments are removed to reduce processing power used by the image manipulation application 106 when calculating the location of the vanishing point.

At block 308, the process 300 involves adding the remaining plane boundaries to the set of line segments. For instance, executing the image manipulation application 106 causes the vanishing point calculator 108 to assign the remaining line segments to the memory location initialized at block 302 to hold the line segments. In one example, blocks 304-308 provide greater detail to an operation of block 206, which is discussed above with respect to FIG. 2.

At block 310, the process 300 involves locating and adding additional line segments with a slope of between +1 and −1 to the set of line segments. For instance, executing the image manipulation application 106 causes the vanishing point calculator 108 to locate line segments located within the planes of the background image 102 with a slope between +1 and −1. In an example, limiting the slope of the line segments to between +1 and −1 removes a set of line segments that are more likely to not converge at the vanishing point of the background image 102. Additionally, a number of line segments are discarded or ignored by limiting a range of the slope of the line segments. Discarding or ignoring line segments reduces processing power used to determine the location of the vanishing point of the background image 102. In one example, block 310 provides greater detail to an operation of block 208, which is discussed above with respect to FIG. 2. Further, the discarding of line segments discussed above with respect to blocks 306 and 310 reduces overall computation costs associated with finding the vanishing point location of the background image 102. For example, fewer line segments used to calculate the vanishing point location results in less computations performed by the vanishing point calculator 108.

At block 312, the process 300 involves returning the set of line segments identified in the process 300. For instance, executing the image manipulation application 106 causes the vanishing point calculator 108 to return the line segments identified in the background image 102 based on the criteria established in the process 300. The set of line segments are usable by the vanishing point calculator 108 at block 210, as discussed above, to determine a location of the vanishing point of the background image 102.

Figure 4:
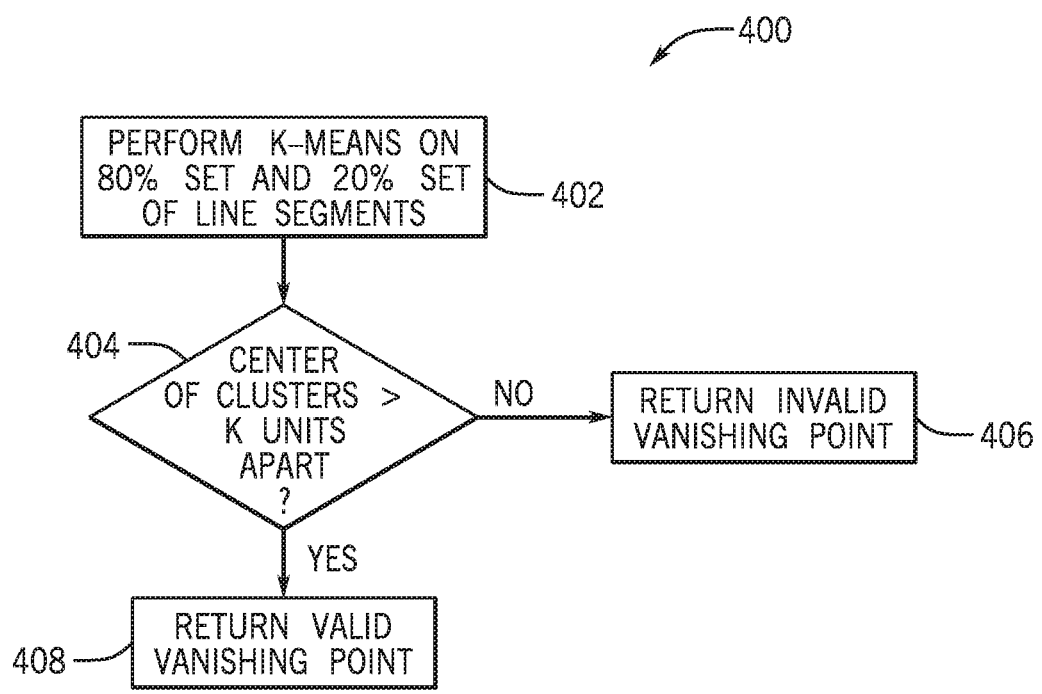
FIG. 4 depicts an example of a process for performing k cross validation to validate a vanishing point calculation, according to certain embodiments of the present disclosure.

FIG. 4 depicts an example of a process 400 for performing k cross validation to validate a vanishing point calculation. One or more processing devices implement operations depicted in FIG. 4 by executing suitable program code (e.g., the image manipulation application 106). For illustrative purposes, the process 400 is described with reference to certain examples depicted in the figures. Other implementations, however, are possible. In one example, the process 400 replaces or supplements block 210 discussed above with respect to FIG. 2.

At block 402, the process 400 involves performing a k-means operation on 80% of the line segments (e.g., a calculation set) of the set of line segments returned at block 312 and an additional k-means operation on a remaining 20% of the line segments (e.g., a validation set) of the set of line segments. Other percentage partitions are also contemplated, and the line segments from the set of line segments are assigned to the calculation set or the validation set randomly.

For instance, executing the image manipulation application 106 causes the vanishing point calculator 108 to partition the set of line segments of the background image 102 randomly into the 80% group and the 20% group. The vanishing point calculator 108 applies a first k-means operation to the 80% group and a second k-means operation to the 20% group. The first and second k-means operations generate two separate convergence point clusters and locate center points of the two separate convergence point clusters. If more than one cluster is generated for the 80% group and the 20% group, a convergence point cluster for each group with the smallest entropy and the largest number of convergence points is selected to represent the convergence point cluster used in the k-means operation.

At block 404, the process 400 involves determining if centers of the two separate convergence point clusters are less than a predefined number of units apart. For instance, executing the image manipulation application 106 causes the vanishing point calculator 108 to compare the center point of the 80% group convergence point cluster with the center point of the 20% group convergence point cluster. The image manipulation application 106 stores a value representative of a difference threshold between the two center points. The distance threshold provides a maximum acceptable difference between the two center points that results in a vanishing point of the background image 102 that is valid. In an example, the difference threshold value is representative of a number of pixels between the two center points of the convergence point clusters.

The value of the difference threshold may increase or decrease based on an image quality of the background image 102. For example, when the image quality of the background image 102 is a greater image quality, the value of the difference threshold may be smaller than an embodiment with a lower image quality.

At block 406, the process 400 involves returning an indication that the calculated vanishing point is invalid when the center points of the convergence point clusters are greater than k units apart. For instance, executing the image manipulation application 106 causes the vanishing point calculator 108 to return an indication that the calculated vanishing point is not valid based on the distances between the center points exceeding the difference threshold value. When the indication that the calculated vanishing point is invalid is provided to a user, it may indicate that the image includes multiple vanishing points. Accordingly, the invalid vanishing point indication may be accompanied by instructions to upload a new image with a single vanishing point.

At block 408, the process 400 involves returning an indication that the calculated vanishing point is valid when the center points of the convergence point clusters are less than k units apart. For instance, executing the image manipulation application 106 causes the vanishing point calculator 108 to return an indication that the calculated vanishing point is valid because the distances between the center points do not exceed the difference threshold value. When the vanishing point calculator 108 returns the valid vanishing point location, the vanishing point location, which is represented by an average convergence location of the calculation set cluster, may be used to manipulate the feature image 104 using the feature manipulator 112, as discussed below with respect to FIG. 7.

Example of Calculating a Vanishing Point Location

Figure 5:
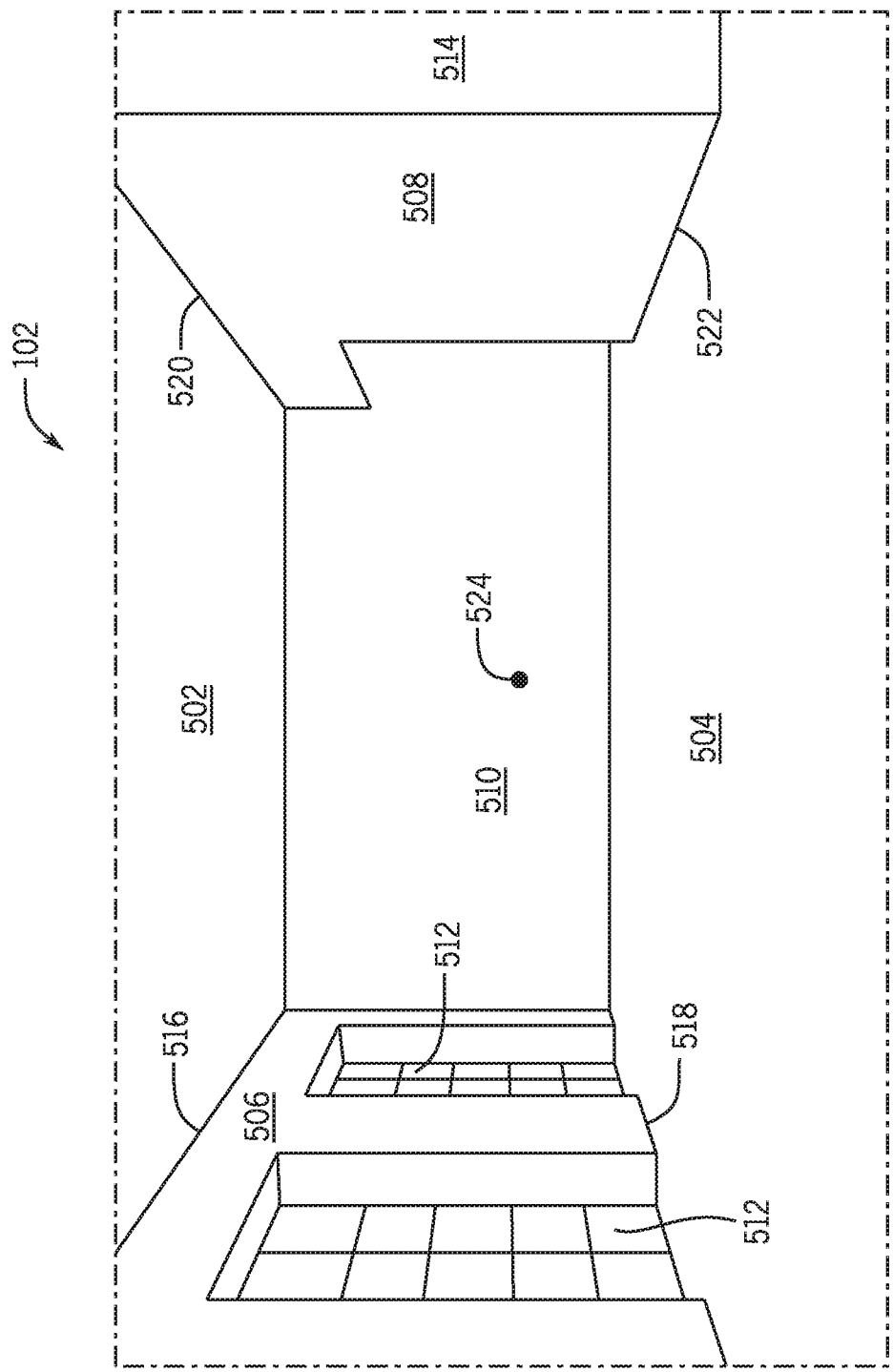
FIG. 5 depicts an example of a background image with a single vanishing point, according to certain embodiments of the present disclosure.

FIG. 5 depicts an example of a background image 500 with a single vanishing point. Generally, interior images include a single vanishing point. The single vanishing point of an interior image allows the image manipulation application 106 to ignore a number of line segments within the background image 500 that are not relevant to calculating a location of the vanishing point within the background image 500. The background image includes a set of planes including a ceiling 502, a floor 504, a left wall 506, a right wall 508, and a back wall 510. In one example, other planes may also be identified, such as windows 512 and a hallway wall 514, during block 204 of the process 200. Line segments used to calculate the vanishing point location originate from boundaries between the planes, and line segments located within the planes. For example, line segments 516, 518, 520, and 522, which are all line segments made from boundaries between planes, all converge on a point 524 that is representative of a location of the vanishing point.

Each plane of the set of planes is classified manually (e.g., using a point and click operation of a computing device) or intelligently (e.g., one or more processors executing instructions are able to identify planes based on a set of rules). To classify a plane, a description is applied to the plane and certain rules are associated with the description. For example, when the feature image 104 is a piece of furniture, the feature image 104 is only able to be placed on the background image over a plane with a description of "floor." Likewise, when the feature image 104 is a picture frame, the feature image 104 is only able to be placed on a plane with a description of "wall." Other rules for placing the feature image 104 on a plane are also contemplated within the scope of the present disclosure.

Figure 6:
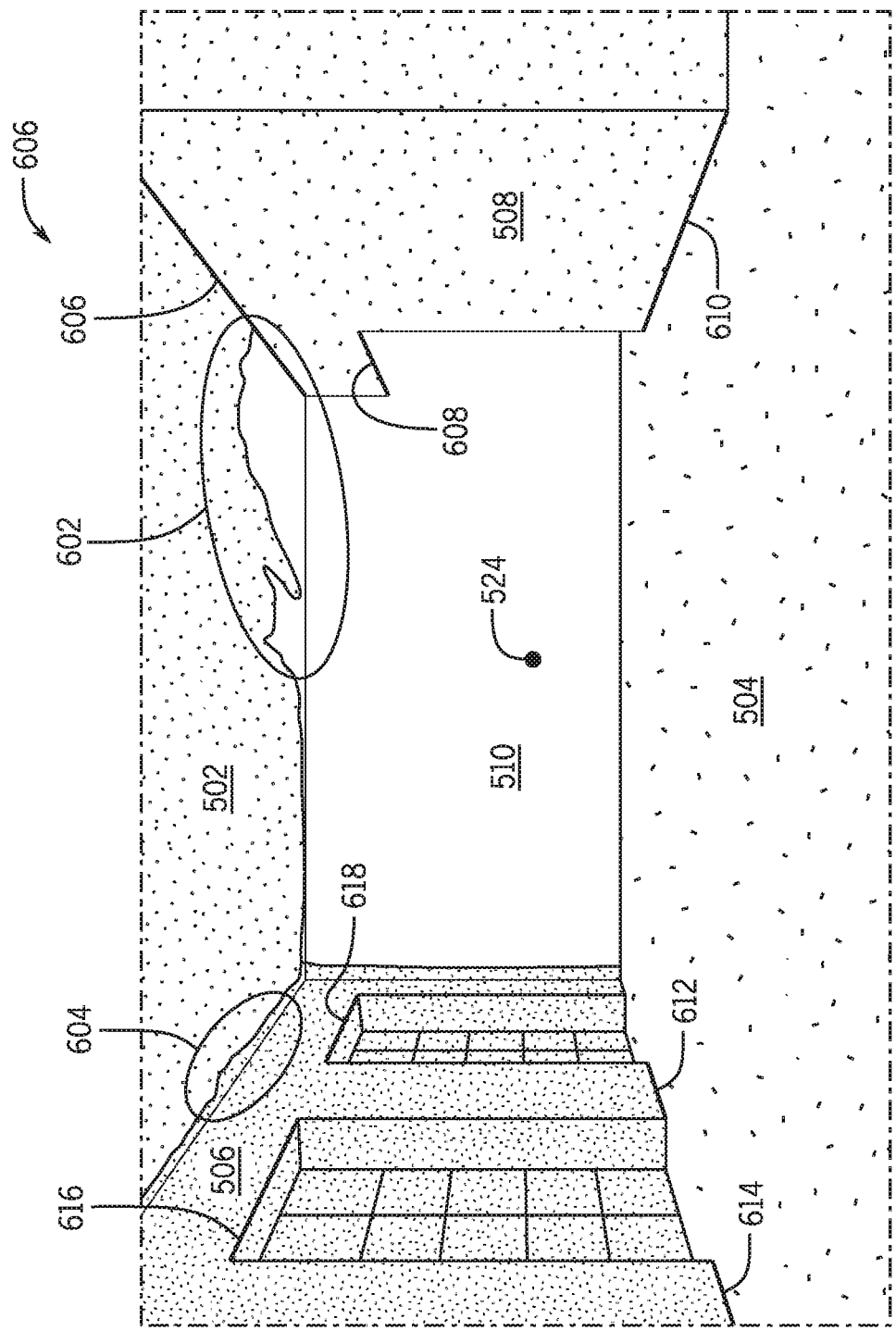
FIG. 6 depicts an example of the background image of FIG. 2 with identified planes, according to certain embodiments of the present disclosure.

FIG. 6 depicts an example of a background image 600 with identified planes. For example, the background image 600 is the background image 102 depicted in FIG. 5 after the background image 102 undergoes a watershed segmentation operation. After a location on each of the planes is classified (e.g., a location of a mouse click on the ceiling 502, the floor 504, the left wall 506, the right wall 508, the back wall 510, or any combination thereof), the watershed segmentation operation identifies the plane boundaries, as discussed in detail above with respect to FIG. 2. The watershed segmentation operation also classifies portions of the image into the classified planes of the background image 102. For example, the watershed operation assigns all of the pixels within plane boundaries to one of the identified planes. As illustrated, the ceiling 502, the floor 504, the left wall 506, the right wall 508, and the back wall 510 are highlighted and assigned to corresponding planes.

The background image 600 also depicts pixel bleeding 602 and 604 from one plane into another plane. In one example, the pixel bleeding 602 and 604 is a result of an image quality of the background image 102. When plane boundaries are blurred, or a difference in gradient magnitude at a plane boundary of two planes is relatively small, the planes defined by the water segmentation operation may bleed across the actual plane boundaries of the background image 102. In an example, when relying on plane boundaries to calculate the vanishing point of the background image 102, line segments associated with plane boundaries that do not generate a straight line (e.g., due to the pixel bleeding 602 and 604) are discarded. Additionally, all of the line segments associated with plane boundaries that generate straight lines may be used in accordance with the process 300, which is discussed above with respect to FIG. 2.

In the depicted background image 600, the point 524, which represents a location of the vanishing point of the background image 600, is determined using line segments 606, 608, 610, 612, 614, 616, and 618. The line segments 606-618 are associated with plane boundaries generated by the watershed segmentation operation that form straight lines and also fit within the process 300 described above with respect to FIG. 3. In particular, the vertical and horizontal plane boundaries identified by the watershed segmentation operation are not used to determine the vanishing point.

Further, in an embodiment where the planes identified by the watershed segmentation operation include additional line segments within the planes (e.g., from wall molding, trim work, door jambs and headers, or any other objects that form lines within the plane boundaries), the additional line segments are also usable as additional reference points in determining the location of the vanishing point. For example, the vanishing point calculator 108 uses the additional line segments from within the boundaries of the planes to identify additional convergence points used in the k-means operations.

Example of Feature Image Manipulation

Figure 7:
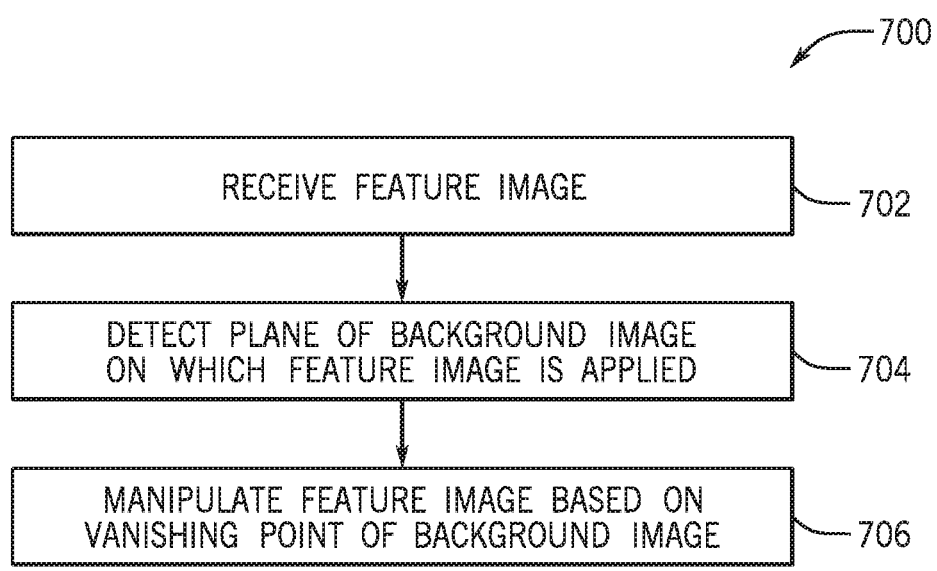
FIG. 7 depicts an example of a process for manipulating a feature image on a background image, according to certain embodiments of the present disclosure.

FIG. 7 depicts an example of a process 700 for manipulating a feature image on a background image. One or more processing devices implement operations depicted in FIG. 7 by executing suitable program code (e.g., the image manipulation application 106). For illustrative purposes, the process 700 is described with reference to certain examples depicted in the figures. Other implementations, however, are possible.

At block 702, the process 700 involves receiving or otherwise accessing a feature image. For instance, executing the image manipulation application 106 causes the blending engine 110 to receive the feature image 104. In one example, the feature image 104 is received when the feature image is placed over a portion of the background image 102. In another example, the feature image 104 may be placed on a default location of the background image 102 for further placement by a user.

At block 704, the process 700 involves detecting a plane of a background image on which the feature image is applied. For instance, executing the image manipulation application 106 causes the blending engine 110 to detect a plane of the background image 102 on which the feature image 104 is positioned. In one example each feature image 104 is manipulated in a different manner by the feature manipulator 112 depending on which plane of the background image 102 the feature image 104 is positioned.

At block 706, the process 700 involves manipulating a feature image based on a vanishing point location of a background image. For instance, executing the image manipulation application 106 causes the feature manipulator 112 to manipulate the feature image 104 based on the vanishing point location of the background image 102 that is calculated by the vanishing point calculator 108. Manipulating the feature image 104 completes the blending process when the image manipulation application 106 places the feature image 104 over the background image 102. When the feature image 104 is placed over the background image 102, the feature image 104 is moved, scaled, perspective warped, or any combination thereof by the feature manipulator 112.

In one example, the feature image 104 is a picture frame and is not able to be positioned on a plane representing the ceiling 502 or the floor 504. Accordingly, when the feature image 104 is positioned over the ceiling 502 or the floor 504 by a user of the image manipulation application 106, the feature manipulator 112 repositions the feature image 104 to a location on one of the walls 506, 508, or 510 that is closest to the original positioning of the picture frame. Other feature images 104 include similar placement limitations. For example, furniture is only able to be placed on the floor 504, and a ceiling fan is only able to be placed on the ceiling 502.

When the feature image 104 is a picture frame, a scaling operation and a perspective warping operation are also provided by the feature manipulator 112. For example, the perspective warping operation provided by the feature manipulator 112 changes a shape of the feature image 104 such that the line segments associated with a top boundary of the picture frame and a bottom boundary of the picture frame are directed at the vanishing point of the background image. Additionally, a scaling operation provided by the feature manipulator 112 changes a size of the feature image 104 based on proximity of the feature image to the vanishing point of the background image 102. For example, the closer a picture frame on the right wall 508 is to the back wall 510, which contains the point 524 representative of the vanishing point, the smaller the picture frame will be in the output blended image 114. Similarly, the further away the picture frame on the right wall 508 is from the back wall 510, the larger the picture frame will be in the output blended image 114.

Figure 8:
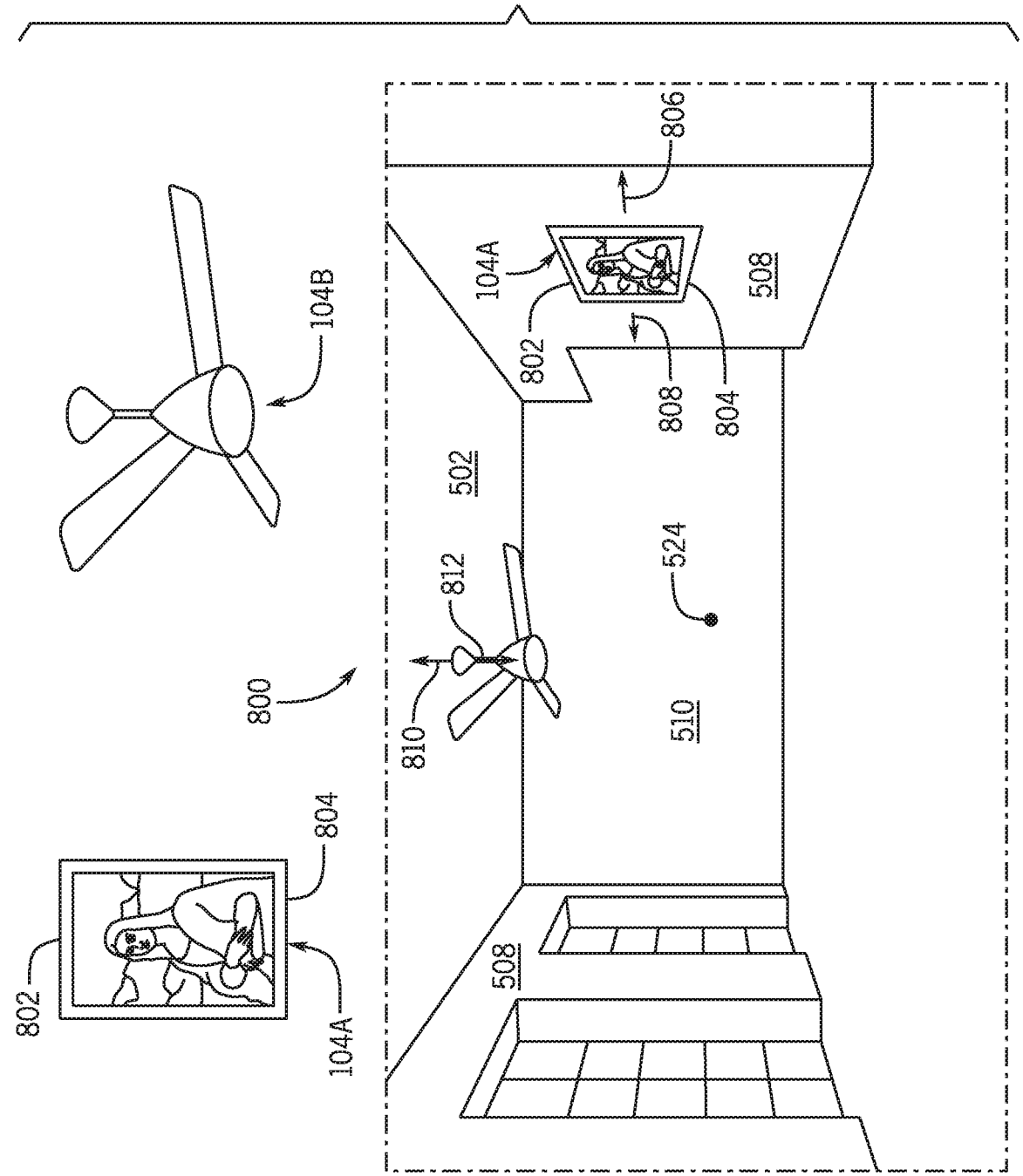
FIG. 8 depicts an example of an output blended image including feature images, according to certain embodiments of the present disclosure.

To help illustrate the feature manipulation provided by the feature manipulator 112, FIG. 8 depicts an example of an output blended image 800 from the image manipulation application 106 including manipulated feature images 104. In one example, the feature image 104A is a piece of framed artwork, and the feature image 104B is a ceiling fan. Each of the feature images 104A and 104B include positioning rules that prohibit the feature images 104A and 104B from being positioned over portions of the background image 102 that would not work in a realistic scenario. For example, the feature image 104A may only be positioned on the walls 506, 508, and 510, and the feature image 104B may only be positioned on the ceiling 502.

As illustrated, the feature image 104A is both scaled and perspective warped. For example, an upper line segment 802 and a lower line segment 804 are both warped in such a manner that the upper line segment 802 and the lower line segment 804 point toward the point 524 representative of the vanishing point. Additionally, as the feature image 104A is moved in a direction 806 along the wall 508, a size of the feature image 104A increases based on the scaling of the feature manipulator 112. Similarly, as the feature image 104A is move in a direction 808 along the wall 508, the size of the feature image 104A decreases as the feature image 104A is perceived to move further away from an observer of the output blended image 800.

Some feature images 104 do not include line segments that rely on perspective warping for the feature image 104 to look correct when placed over the background image 102. In one example, the feature image 104B, which is a ceiling fan, does not include line segments that rely on perspective warping. However, the feature image 104B remains affected by scaling issues. For example, as the feature image 104B moves in a direction 810, the feature image 104B increases in size such that an observer of the output blended image 800 has the perception that the feature image 104B is closer to the observer. Similarly, as the feature image 104B moves in a direction 812, the feature image 104B decreases in size such that the observer of the output blended image 800 has the perception that the feature image 104B is further away from the observer.

Example of a Computing System for Executing an Image Manipulation Application

Figure 9:
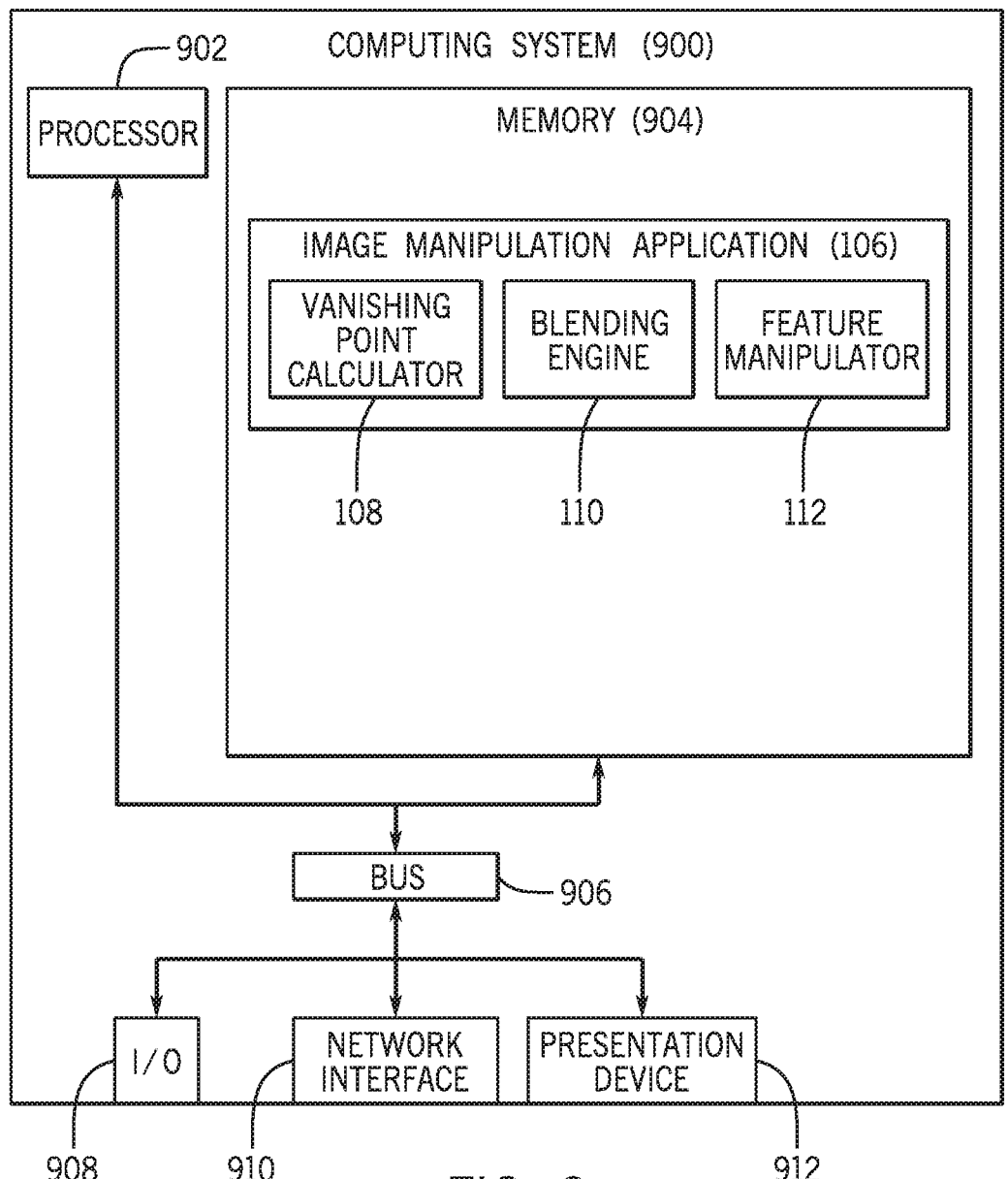
FIG. 9 depicts an example of a computing system for performing various operations described herein, according to certain embodiments of the present disclosure.

Any suitable computing system or group of computing systems can be used for performing the operations described herein. FIG. 9 depicts an example of a computing system 900 for performing various operations described herein, according to certain embodiments of the present disclosure. In some embodiments, the computing system 900 executes the image manipulation application 106, as depicted in FIG. 9. In other embodiments, separate computing systems having devices similar to those depicted in FIG. 9 (e.g., a processor, a memory, etc.) separately execute the image manipulation application 106.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 900 may also include a number of external or internal devices, such as input or output devices. For example, the computing system 900 is shown with one or more input/output ("I/O") interfaces 908. An I/O interface 908 can receive input from input devices or provide output to output devices. One or more buses 906 are also included in the computing system 900. The bus 906 communicatively couples one or more components of a respective one of the computing system 900.

The computing system 900 executes program code that configures the processor 902 to perform one or more of the operations described herein. The program code includes, for example, the image manipulation application 106, the vanishing point calculator 108, the blending engine 110, the feature manipulator 112, or other suitable applications that perform one or more operations described herein. The program code may be resident in the memory device 904 or any suitable computer-readable medium and may be executed by the processor 902 or any other suitable processor. In additional or alternative embodiments, the program code described above is stored in one or more other memory devices accessible via a data network.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices (e.g., a computing device executing an image manipulation application 106) via a data network using the network interface device 910.

In some embodiments, the computing system 900 also includes the presentation device 912. A presentation device 912 can include any device or group of devices suitable for providing visual, auditory, or other suitable sensory output. Non-limiting examples of the presentation device 912 include a touchscreen, a monitor, a speaker, a separate mobile computing device, etc. In some aspects, the presentation device 912 can include a remote client-computing device that communicates with the computing system 900 using one or more data networks described herein. Other aspects can omit the presentation device 912.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for modifying image content based on a vanishing point location computed for a background image, wherein the method includes one or more processing devices performing operations comprising:
  receiving the background image;
  classifying a set of planes present in the background image;
  identifying, using plane boundaries of the set of planes, a first set of line segments that define first convergence points;
  identifying a second set of line segments that are positioned within individual planes of the set of planes and that define second convergence points;
  performing a k-means clustering operation on the first convergence points and the second convergence points to group the first convergence points and the second convergence points into a cluster, wherein the k-means clustering operation comprises a k cross validation to validate the vanishing point location;
  computing the vanishing point location from an average of point locations in the cluster; and
  manipulating a feature image overlaid on the background image to generate a blended image based on the vanishing point location.

2. The method of claim 1, wherein the k cross validation comprises:
  randomly separating the first set of line segments and the second set of line segments into a calculation set of line segments and a validation set of line segments;
  generating the average of point locations in the cluster of convergence points of the calculation set of line segments to generate the vanishing point location;
  generating an additional average of validation point locations in an additional cluster of convergence points of the validation set of line segments; and
  validating the vanishing point location based on a distance between the vanishing point location and the additional average of validation point locations.

3. The method of claim 2, wherein the calculation set of line segments comprises 80% of the first set of line segments and the second set of line segments, and the validation set of line segments comprises 20% of the first set of line segments and the second set of line segments.

4. The method of claim 1, wherein the background image is an interior image, and the vanishing point location is a sole vanishing point of the background image.

5. The method of claim 1, wherein identifying the first set of line segments comprises:
  performing a watershed algorithm that identifies the plane boundaries of the set of planes; and
  discarding the plane boundaries that are perpendicular and parallel to a horizontal axis of the background image.

6. The method of claim 1, wherein identifying the second set of line segments comprises:
  identifying internal line segments within the set of planes; and
  discarding the internal line segments with a slope greater than +1 and less than −1.

7. The method of claim 1, wherein manipulating the feature image comprises applying a perspective warp to the feature image, scaling the feature image based on proximity to the vanishing point location, or a combination thereof.

8. The method of claim 1, wherein manipulating the feature image overlaid on the background image further comprises:
  restricting the feature image from being overlaid on at least one plane of the set of planes of the background image based on image contents of the feature image.

9. A computing system comprising:
  means for receiving a background image;
  means for classifying a set of planes present in the background image;
  means for identifying, using plane boundaries of the set of planes, a first set of line segments that define first convergence points;
  means for identifying a second set of line segments that are positioned within individual planes of the set of planes and that define second convergence points;
  means for performing a k-means clustering operation on the first convergence points and the second convergence points to group the first convergence points and the second convergence points into a cluster, wherein the k-means clustering operation comprises a k cross validation to validate a vanishing point location;
  means for computing the vanishing point location from an average of point locations in the cluster; and
  means for manipulating a feature image overlaid on the background image to generate a blended image based on the vanishing point location.

10. The computing system of claim 9, wherein the cross validation comprises:
  means for randomly separating the first set of line segments and the second set of line segments into a calculation set of line segments and a validation set of line segments;
  means for generating the average of point locations in the cluster of convergence points of the calculation set of line segments to generate the vanishing point location;
  means for generating an additional average of validation point locations in an additional cluster of convergence points of the validation set of line segments; and
  means for validating the vanishing point location based on a distance between the vanishing point location and the additional average of validation point locations.

11. The computing system of claim 10, wherein the calculation set of line segments comprises 80% of the first set of line segments and the second set of line segments, and the validation set of line segments comprises 20% of the first set of line segments and the second set of line segments.

12. The computing system of claim 9, wherein the background image is an interior image, and the vanishing point location is a sole vanishing point of the background image.

13. The computing system of claim 9, wherein the means for identifying the first set of line segments comprises:
  means for performing a watershed algorithm that identifies the plane boundaries of the set of planes; and
  means for discarding the plane boundaries that are perpendicular and parallel to a horizontal axis of the background image.

14. The computing system of claim 9, wherein the means for identifying the second set of line segments comprises:
  means for identifying internal line segments within the set of planes; and means for discarding the internal line segments with a slope greater than +1 and less than −1.

15. A non-transitory computer-readable medium having instructions stored thereon, the instructions executable by a processing device to perform operations comprising:
receiving a background image;
classifying a set of planes present in the background image;
identifying, using plane boundaries of the set of planes, a first set of line segments that define first convergence points;
identifying a second set of line segments that are positioned within individual planes of the set of planes and that define second convergence points;
performing a k-means clustering operation on the first convergence points and the second convergence points, wherein the k-means clustering operation comprises a k cross validation to validate a vanishing point location;
computing the vanishing point location from an average of point locations in a cluster of convergence points generated by the k-means clustering operation; and
manipulating a feature image overlaid on the background image to generate a blended image based on the vanishing point location.

16. The non-transitory computer-readable medium of claim 15, wherein manipulating the feature image comprises applying a perspective warp to the feature image, scaling the feature image based on proximity to the vanishing point location, or a combination thereof.

17. The non-transitory computer-readable medium of claim 15, wherein manipulating the feature image overlaid on the background image further comprises:
restricting the feature image from being overlaid on at least one plane of the set of planes of the background image based on image contents of the feature image.

18. The non-transitory computer-readable medium of claim 15, wherein the k cross validation comprises:
randomly separating the first set of line segments and the second set of line segments into a calculation set of line segments comprising 80% of the first set of line segments and the second set of line segments, and a validation set of line segments comprising 20% of the first set of line segments and the second set of line segments;
generating the average of point locations in the cluster of convergence points of the calculation set of line segments to generate the vanishing point location;
generating an additional average of validation point locations in an additional cluster of convergence points of the validation set of line segments; and
validating the vanishing point location based on a distance between the vanishing point location and the additional average of validation point locations.

19. The non-transitory computer-readable medium of claim 15, wherein the background image is an interior image, and the vanishing point location is a sole vanishing point of the background image.

* * * * *